United States Patent
Hosokawa

(10) Patent No.: US 9,930,073 B2
(45) Date of Patent: *Mar. 27, 2018

(54) RADIO COMMUNICATION SYSTEM, RADIO APPARATUS, RADIO COMMUNICATION METHOD, PACKET GENERATION METHOD, AND METHOD FOR REPRODUCING DATA FROM PACKET

(71) Applicant: ICOM INCORPORATED, Osaka (JP)

(72) Inventor: Keisuke Hosokawa, Osaka (JP)

(73) Assignee: ICOM INCORPORATED, Osaka (JP)

( * ) Notice: Subject to any disclaimer, the term of this patent is extended or adjusted under 35 U.S.C. 154(b) by 102 days.

This patent is subject to a terminal disclaimer.

(21) Appl. No.: 15/046,990

(22) Filed: Feb. 18, 2016

(65) Prior Publication Data

US 2016/0249251 A1  Aug. 25, 2016

(30) Foreign Application Priority Data

Feb. 19, 2015 (JP) ................................ 2015-030810

(51) Int. Cl.
- *H04W 28/06* (2009.01)
- *H04L 29/06* (2006.01)
- *G10L 19/16* (2013.01)

(52) U.S. Cl.
CPC ............ *H04L 65/00* (2013.01); *G10L 19/167* (2013.01); *H04L 69/22* (2013.01)

(58) Field of Classification Search
CPC ........ H04L 65/00; H04L 69/22; G10L 19/167

USPC .......................................................... 370/328
See application file for complete search history.

(56) References Cited

U.S. PATENT DOCUMENTS

| | | | | |
|---|---|---|---|---|
| 6,449,352 B1* | 9/2002 | Takahashi | ............... | H04L 29/06 375/E7.022 |
| 2007/0022208 A1* | 1/2007 | Hashimoto | ............ | H04N 5/782 709/231 |
| 2009/0208219 A1* | 8/2009 | Rhodes | .................. | H04B 13/02 398/104 |
| 2010/0110078 A1* | 5/2010 | Yanai | .................... | G06T 11/206 345/440 |
| 2016/0247505 A1* | 8/2016 | Adachi | .................. | H04L 69/22 |

FOREIGN PATENT DOCUMENTS

JP       2006-157477    *  6/2006  ........... H04L 12/951

* cited by examiner

*Primary Examiner* — Afsar M Qureshi
(74) *Attorney, Agent, or Firm* — Wenderoth, Lind & Ponack, L.L.P.

(57) ABSTRACT

When operating the radio communication system in a mode for transmitting data for data communication instead of audio signal data, a transmission unit of a radio apparatus generates a packet in which data for data communication is inserted in positions in an audio frame, except for a given position, and in a data frame, and unique data is inserted in the given position in the audio frame. Also, data that is likely to cause an error when the data inserted in the audio frame is decoded by using an audio codec is used as the unique data.

7 Claims, 5 Drawing Sheets

| Audio frame (9 bytes) |||||||||
|---|---|---|---|---|---|---|---|---|
| 1 | 2 | 3 | 4 | 5 | 6 | 7 | 8 | 9 |
| Audio signal data |||||||||

| Audio frame (9 bytes) |||||||||
|---|---|---|---|---|---|---|---|---|
| 1 | 2 | 3 | 4 | 5 | 6 | 7 | 8 | 9 |
| Data for data communication |||| Unique | Data for data communication ||||

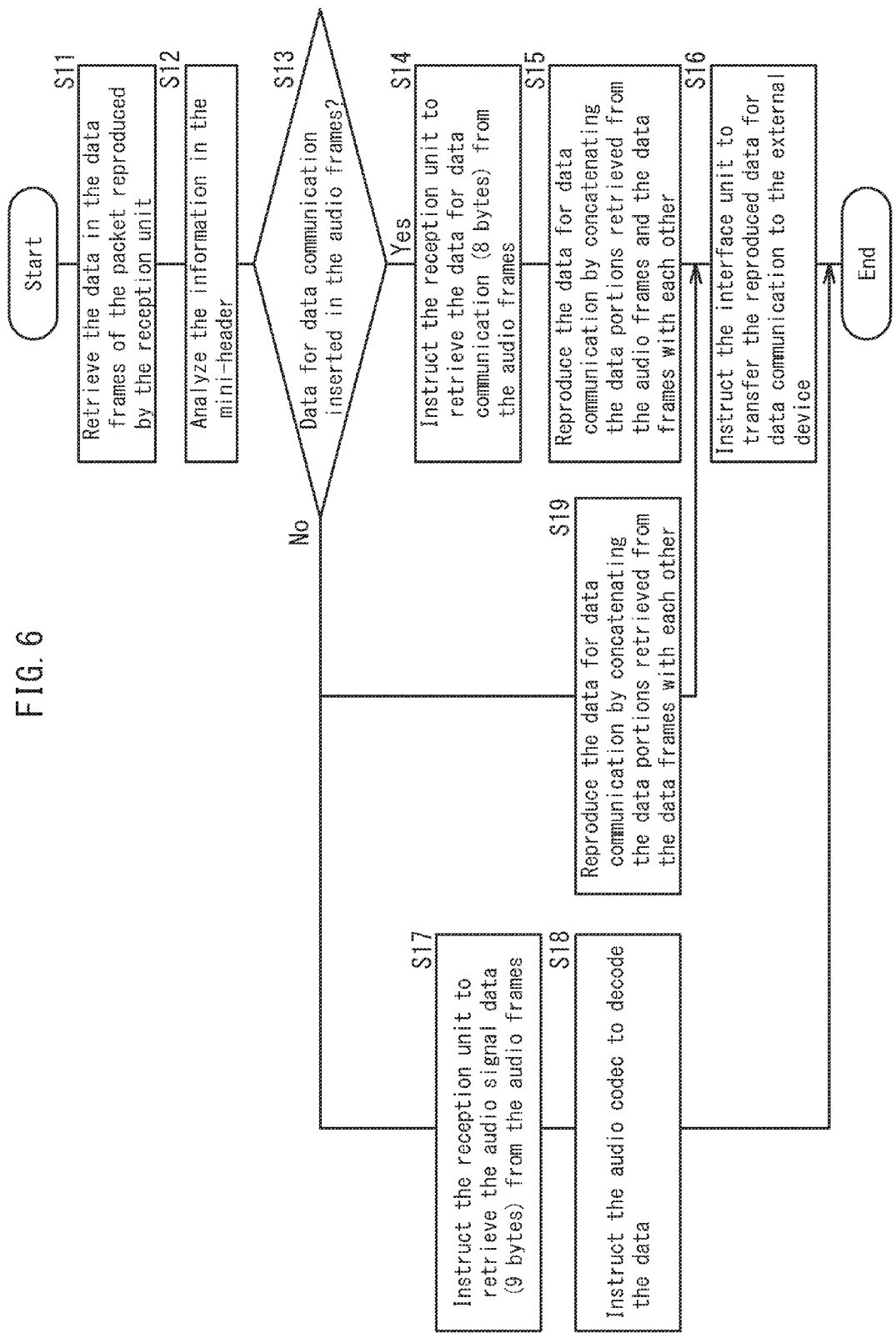

RADIO COMMUNICATION SYSTEM, RADIO APPARATUS, RADIO COMMUNICATION METHOD, PACKET GENERATION METHOD, AND METHOD FOR REPRODUCING DATA FROM PACKET

CROSS REFERENCE TO RELATED APPLICATIONS

The disclosure of Japanese Patent Application serial No. 2015-30810, filed on Feb. 19, 2015, including the specification, drawings and abstract is incorporated herein by reference in its entirety.

BACKGROUND OF THE INVENTION

Field of the Invention

The present invention relates to a radio communication system employing digital audio communication, a radio apparatus used in the system, and a radio communication method, a packet data generation method, and a method for reproducing data from a packet, which correspond to the system.

Description of the Related Art

In recent years, a digitized and networked environment for audio communication has been developing in the field of amateur radio for example, so that the users can enjoy communication at higher speed and exchange clearer audio messages. In a radio communication system employing such digital audio communication, audio signals are encoded and converted into digital signals, and are transmitted after being packetized (for example, see JP 2006-157477A).

In the aforementioned radio communication system, data indicating call signs of the transmission destination and the transmission source, etc. are added to the header part of the packet, and accordingly the system can achieve many functions such as the function of performing communication with the designation of the communication party radio apparatus, which cannot be achieved by analogue radio communication systems.

Furthermore, according to the aforementioned radio communication system, audio frames and data frames, each having a predetermined length, are consecutively arranged one after the other, so that data for audio communication and data for data communication can be simultaneously transmitted.

Therefore, with use of this function, image signals captured by a camera can be transmitted from one radio apparatus to another radio apparatus during communication, so that the image is displayed on a display and the users can enjoy a conversation while seeing the image, for example.

However, the aforementioned conventional radio communication system is designed for audio communication, and the amount of data that can be transmitted in data communication is set to be smaller than the amount of data that can be transmitted by audio communication, and accordingly the communication speed of the data communication is not necessarily high.

BRIEF SUMMARY OF THE INVENTION

In order to increase the communication speed of data communication according to the above-described radio communication system, the inventors, etc., of the present invention proposed to insert data for data communication into audio frames used for transmitting audio signal data, and to thus transmit data for data communication. The present invention is made in relation to this proposal.

In the following description, the communication mode in which audio signal data is inserted into audio frames is referred to as "slow data mode", and the communication mode in which data for data communication is inserted into audio frames is referred to as "fast data mode", based on the difference in the communication speed of data communication.

In the case where a packet in which a data signal for data communication is inserted in the above-described audio frames is received by an existing radio apparatus that does not support the fast data mode, data for data communication inserted in the audio frames is decoded as audio data, and is output as an abnormal sound from the speaker. Therefore, the proposal above cannot be adopted as it is in such a case.

The present invention is made in view of such a situation, and aims to provide a radio communication system, a radio apparatus, a radio communication method, a packet generation method, and a method for reproducing data from a packet, by which, even in the case where an existing radio apparatus that does not support the fast data mode receives a packet in which a data signal for data communication is inserted in the audio frames, the abnormal sound can be reduced to such a level that is not problematic in practical use.

To achieve the aim above, a radio communication system according to the present invention is a radio communication system including at least two radio apparatuses, each radio apparatus comprising:

a transmission unit configured to generate a packet including: a header part containing identifier data identifying at least a transmission destination radio station and a transmission source radio station; and a data part in which an audio frame and a data frame, each having a predetermined length, are consecutively arranged one after another, to insert audio signal data into the audio frame of the packet and to insert data other than the audio signal data into the data frame of the packet, and to thereafter convert the packet into a radio signal and transmit the radio signal;

a reception unit configured to receive the radio signal, to reproduce a packet from the radio signal, to retrieve the audio signal data from the audio frame of the packet, and to retrieve the data other than the audio signal data from the data frame of the packet;

an audio codec configured to generate a digital audio signal by performing A/D conversion and encoding on an analogue audio signal and thereafter transmit the digital audio signal to the transmission unit, and to reproduce an analogue audio signal by performing decoding and D/A conversion on a digital audio signal received from the reception unit; and a controller configured to instruct the transmission unit to generate a packet, and to instruct the reception unit to reproduce a packet from a received radio signal, wherein, when communication is performed in a fast data mode in which data for data communication to be transmitted, instead of audio signal data, is inserted in the audio frame, the transmission unit of a radio apparatus serving as a sender, generates according to an instruction from the controller, a packet in which the data for data communication is inserted in positions in the audio frame, excluding a given position, and in the data frame, and unique data is inserted in the given position in the audio frame, and the controller of a radio apparatus serving as a recipient, which has received a radio signal, instructs the reception unit to retrieve data portions other than the unique data from the audio frame and the data frame of the packet, which has been reproduced, and reproduces the data for data communication by concatenating the retrieved data portions.

A radio apparatus according to the present invention is a radio apparatus comprising:

a transmission unit configured to generate a packet including: a header part containing identifier data identifying at least a transmission destination radio station and a transmission source radio station; and a data part in which an audio frame and a data frame, each having a predetermined length, are consecutively arranged one after another, to insert audio signal data into the audio frame of the packet and to insert data other than the audio signal data into the data frame of the packet, and to thereafter convert the packet into a radio signal and transmit the radio signal;

an audio codec configured to generate a digital audio signal by performing A/D conversion and encoding on an analogue audio signal and thereafter transmit the digital audio signal to the transmission unit; and a controller configured to instruct the transmission unit to generate a packet, wherein, when operating in a fast data mode in which data for data communication to be transmitted, instead of audio signal data, is inserted in the audio frame, the transmission unit generates, according to an instruction from the controller, a packet in which the data for data communication is inserted in positions in the audio frame, excluding a given position, and in the data frame, and in which unique data is inserted in the given position in the audio frame.

A radio communication method according to the present invention is a radio communication method for a radio communication system including at least two radio apparatuses, one of the at least two radio apparatuses being configured to generate a packet including: a header part containing identifier data identifying at least a transmission destination radio station and a transmission source radio station; and a data part in which an audio frame and a data frame, each having a predetermined length, are consecutively arranged one after another, and to convert the packet into a radio signal and transmit the radio signal, and another one of the at least two radio apparatuses being configured to receive the radio signal and reproduce a packet from the received radio signal, the radio communication method comprising the steps of:

in a radio apparatus serving as a sender,
generating a packet in which data for data communication is inserted in positions in the audio frame, excluding a given position, and in the data frame, and unique data is inserted in the given position in the audio frame; and
converting the packet thus generated into a radio signal, and transmitting the radio signal, and
in a radio apparatus serving as a recipient,
receiving the radio signal;
reproducing a packet from the received radio signal;
retrieving data portions other than the unique data from the audio frame and the data frame of the reproduced packet; and
reproducing data for data communication by concatenating the retrieved data portions.

A packet generation method according to the present invention is a packet generation method for a radio apparatus that performs communication with another radio apparatus by using a packet including: a header part containing identifier data identifying at least a transmission destination radio station and a transmission source radio station; and a data part in which an audio frame and a data frame, each having a predetermined length, are consecutively arranged one after another, the packet generation method comprising the step of:

generating a packet in which data for data communication is inserted in positions in the audio frame, excluding a given position, and in the data frame, and unique data is inserted in the given position in the audio frame.

A method for reproducing data from a packet according to the present invention is a method for reproducing data from a packet performed by a radio apparatus that is configured to receive a radio signal containing a packet generated by the above-described packet generation method and reproduces the packet from the radio signal, the method comprising the steps of:

retrieving data portions other than the unique data from the audio frame and the data frame of the reproduced packet; and reproducing the data for data communication by concatenating the retrieved data portions.

By using the radio communication system according to the present invention, even in the case where an existing radio apparatus that does not support the fast data mode receives a packet in which data for data communication is inserted in the audio frames, the abnormal sound generated by the speaker can be reduced to such a level that is not problematic in practical use.

Consequently, even in the case of using a mix of an existing radio apparatus that performs communication in the slow data mode and a radio apparatus that supports the fast data mode, to which the function of inserting a data signal for data communication into audio frames and transmitting the data signal is added, communication can be performed without a problem.

Also, the functions realized by the above-described radio communication system can be realized by the radio apparatus, the radio communication method, the packet generation method, and the method for reproducing data from a packet according to the present invention, with a similar configuration or method.

These and other objects, features and advantages of the present invention will become more apparent upon reading of the following detailed description along with the accompanied drawings.

BRIEF DESCRIPTION OF THE DRAWINGS

FIG. 6 is a flowchart showing processing performed by a controller of a radio apparatus that has received a packet.

DETAILED DESCRIPTION OF THE INVENTION

The following describes a radio communication system according to an embodiment of the present invention, with reference to the drawings.

Configuration of Radio Apparatus

Figure 1:
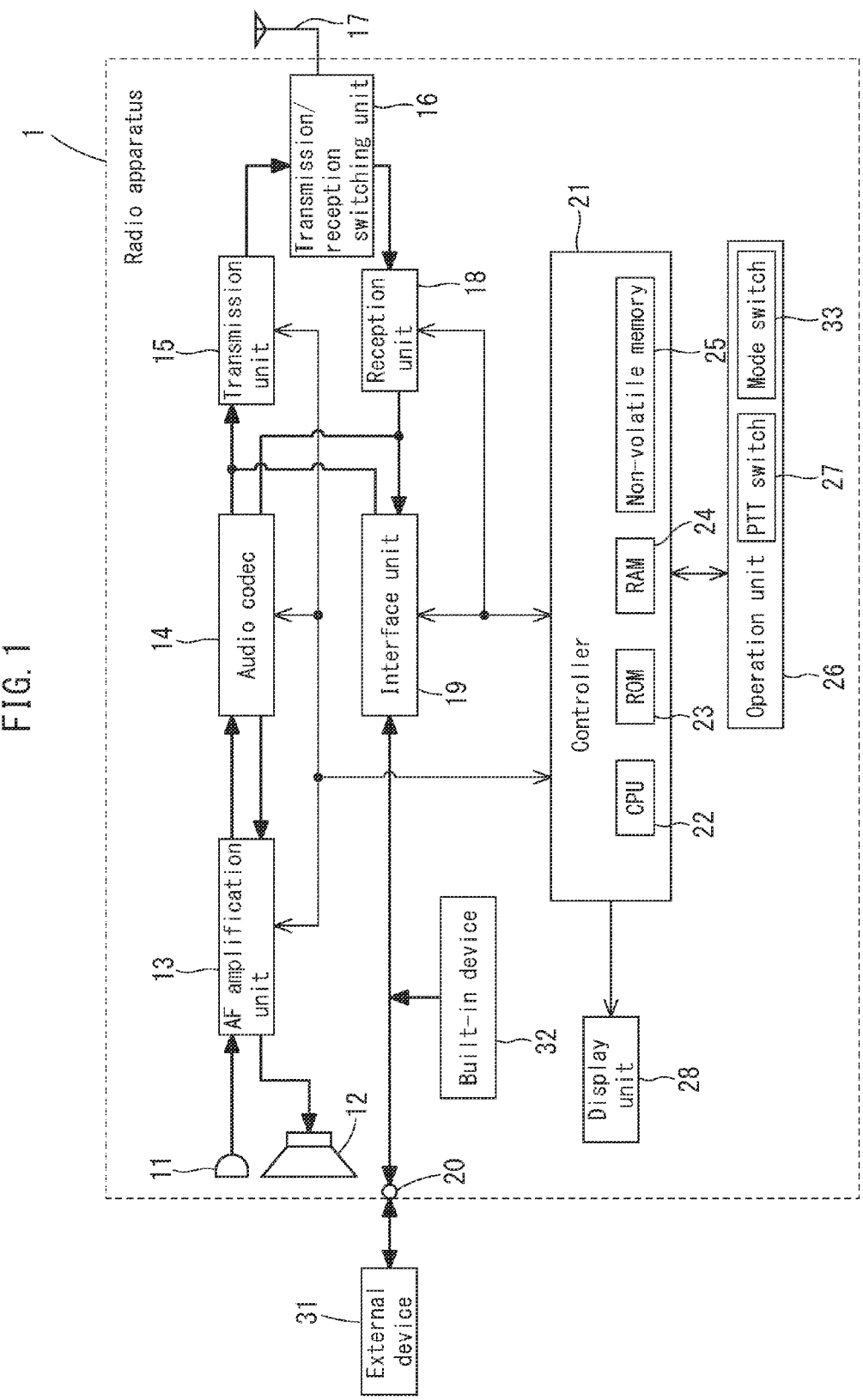
FIG. 1 is a block diagram showing a configuration of a radio apparatus used in a radio communication system according to an embodiment of the present invention.

FIG. 1 shows a configuration of a radio apparatus used in a radio communication system according to the present embodiment. A radio apparatus 1 includes a microphone 11, a speaker 12, an AF amplification unit 13, an audio codec 14, a transmission unit 15, a transmission/reception switching unit 16, an antenna 17, a reception unit 18, an interface unit 19, a controller 21, an operation unit 26, and a display unit 28. In the drawing, thick arrows indicate the flow of an audio signal, data, etc., and thin arrows indicate the flow of a control system signal.

The microphone 11 generates an analogue audio signal from input audio to be transmitted, and outputs the audio signal to the AF amplification unit 13. The speaker 12 converts an analogue audio signal output from the AF amplification unit 13, to a sound.

The AF (Audio Frequency) amplification unit 13 amplifies an analogue audio signal input from the microphone 11, and supplies the resultant signal to the audio codec 14. The AF amplification unit 13 also amplifies an analogue audio signal of reception sound supplied from the audio codec 14, and outputs the resultant signal to the speaker 12.

The audio codec 14 performs A/D (analogue/digital) conversion and encoding on an analogue audio signal supplied from the AF amplification unit 13, and outputs the resultant signal to the transmission unit 15. The audio codec 14 also decodes, and furthermore performs D/A (digital/analogue) conversion on, a digital audio signal supplied from the reception unit 18, and outputs the resultant signal to the AF amplification unit 13.

Figure 2:
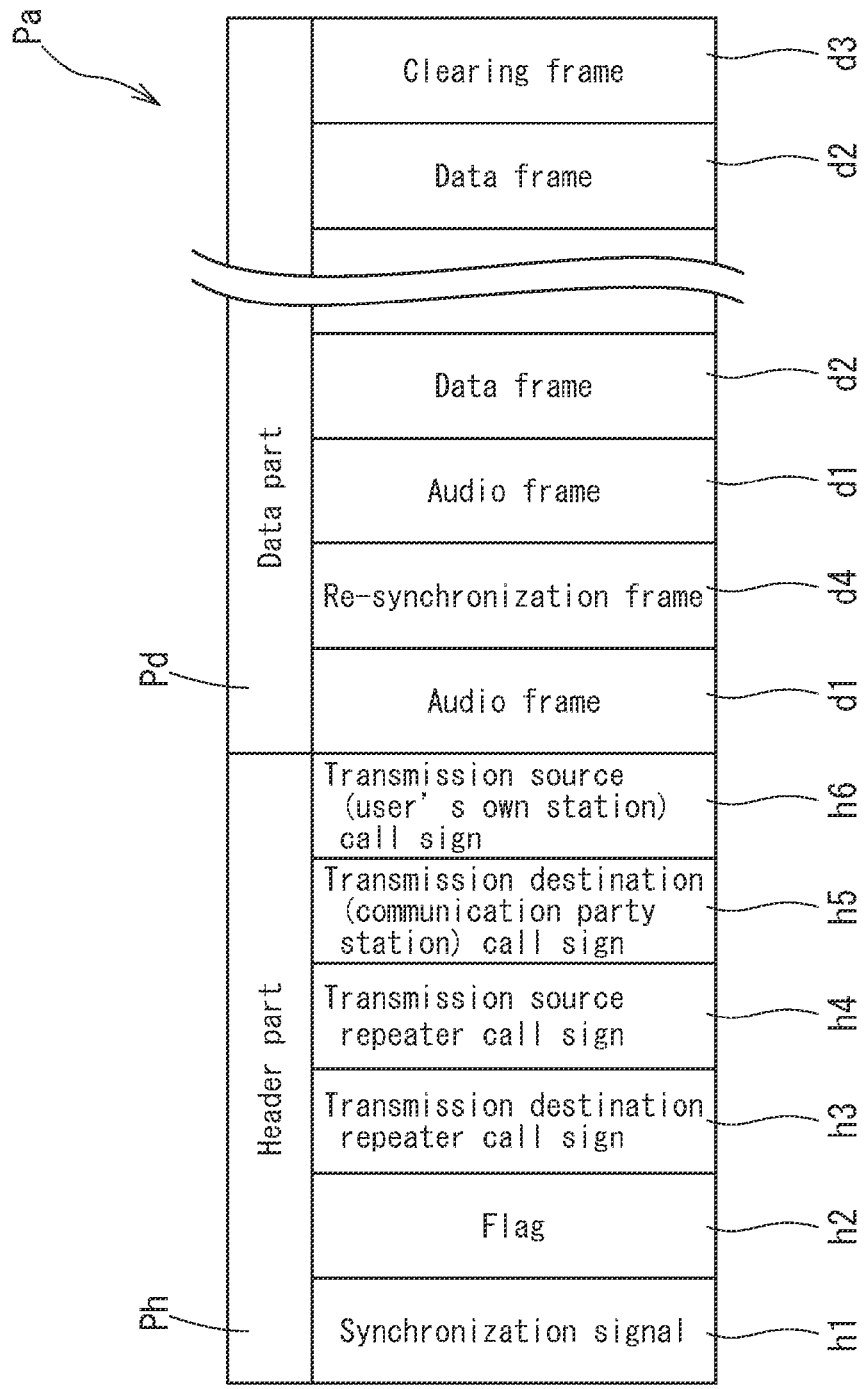
FIG. 2 is a diagram showing a configuration of a packet transmitted by the radio apparatus.

The transmission unit 15 adds a header for radio communication to a digital audio signal supplied from the audio codec 14, and also generates a packet for transmission as shown in FIG. 2, based on an output from a PTT switch 27 described later. The configuration of the packet will be described later in detail with reference to FIG. 2. The transmission unit 15 furthermore modulates a carrier wave by using digital data contained in the packet, and transmits the resultant wave from the antenna 17 via the transmission/reception switching unit 16.

The transmission/reception switching unit 16 delivers the transmission signal from the transmission unit 15 to the antenna 17 when the PTT switch 27 is pressed and turned ON, and delivers the reception signal of the antenna 17 to the reception unit 18 when the PTT switch 27 is released and turned OFF.

The reception unit 18 changes the reception frequency according to an instruction signal from the controller 21, amplifies the reception signal obtained by tuning to the reception frequency, and furthermore, demodulates the resulting signal to reproduce a packet. Then, the reception unit 18 removes the header part from the reproduced packet, and supplies the audio signal data to the audio codec 14 and supplies the other data (e.g., packet data of an image signal, etc.) to the interface unit 19.

The interface unit 19 is connected to an external device 31 (e.g., a personal computer or a smartphone) via an external connection terminal 20 and to a device 32 (e.g., a GPS receiver) that is built into the radio apparatus, and supplies packet data supplied from the external device 31 and the built-in device 32, such as an image signal, to the transmission unit 15 and the controller 21. The interface unit 19 also supplies packet data supplied from the reception unit 18, to the external device 31 via the external connection terminal 20.

The controller 21 controls the operation of the radio apparatus 1. The controller 21 includes a CPU (Central Processing Unit) 22, a ROM (Read Only Memory) 23 storing a program operating on the CPU 22, a RAM (Random Access Memory) 24 serving as a work memory for the CPU 22, and a non-volatile memory 25 storing data such as a call sign. Although not described every time, an instruction from the controller 21 to each unit is made by transmitting a command.

The operation unit 26 conveys various sorts of inputs and user instructions to the controller 21. The operation unit 26 includes the PTT (Push To Talk) switch 27 and a mode switch 33 that is for switching between communication modes. When the PTT switch 27 is pressed (turned ON), the transmission/reception switching unit 16 switches to the transmission mode and a transmission from the antenna 17 is performed, and when the PTT switch 27 is released (turned OFF), the transmission/reception switching unit 16 switches to the reception mode and the reproduction of the received audio signal is performed.

The display unit 28 includes a liquid crystal display or the like, and is used for displaying various sorts of data. The screen of the display unit 28 displays, for example, information indicating that the radio apparatus 1 has received amateur radio signals (there has been a call), and call signs or nicknames of the transmission source (the user's own station) and the transmission destination (the communication party station).

Configuration of Packet

Figure 3:
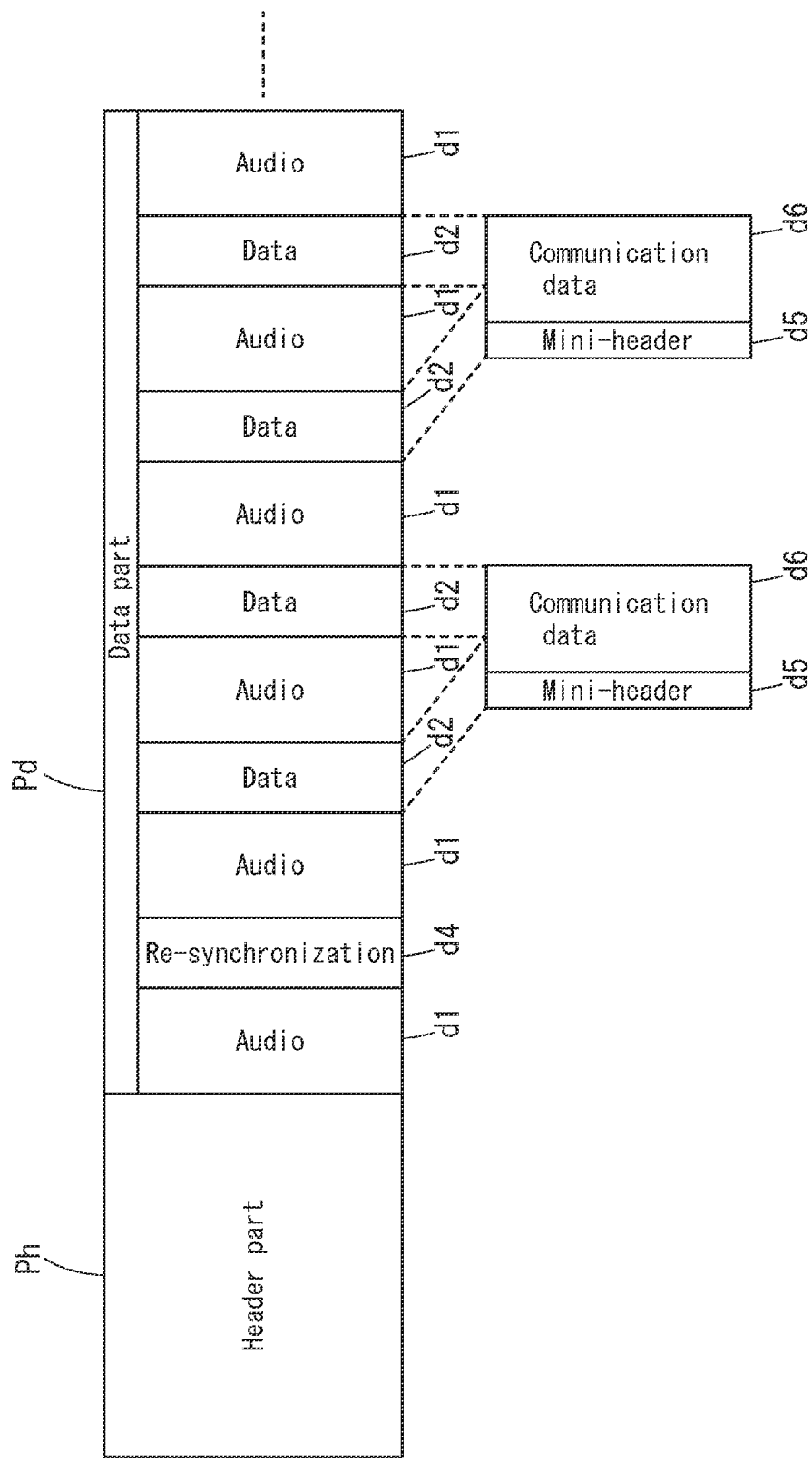
FIG. 3 is a diagram showing types of data to be inserted in frames of the data part of a packet.

Next, with reference to FIG. 2 and FIG. 3, a description is given of the configuration of a packet generated by the transmission unit 15. The configuration of the packet shows the order and the grouping of a series of data pieces to be transmitted in digital audio communication.

As shown in FIG. 2, a packet Pa includes a header part Ph and a data part Pd. The header part Ph includes a synchronization signal h1, a flag h2, a transmission destination repeater call sign h3, a transmission source repeater call sign h4, a transmission destination call sign h5, and a transmission source call sign h6.

The synchronization signal h1 in the header part Ph is used for synchronization with the reception signal, and indicates the starting point of the signal. The flag h2 is data for indicating communication via a repeater, direct communication, a repeater control signal, etc., and is composed of a plurality of bits.

The transmission destination repeater call sign h3 is, for example, the call sign of a repeater station within the repeater area to which the transmission destination radio station belongs, and the transmission source repeater call sign h4 is a call sign of a repeater station within the repeater area to which the transmission source radio station belongs. The transmission destination call sign h5 is the call sign of the communication party station at the destination of the transmission, and the transmission source call sign h6 is the call sign of the user's own station. These call signs (h3 to h6) serve as identifiers for identifying the radio stations at the transmission destination and the transmission source, as well as the repeater stations that relay the radio signals. Note that the transmission destination call sign h5 may be CQ for making a call without the designation of any particular station.

In order to achieve the simultaneous transmission of data for audio communication and data for data communication, the data part Pd includes audio frames d1 and data frames d2, which are arranged one after the other, and a clearing frame d3 is attached to the end. Each of the audio frames d1 has a predetermined length, and a digitized audio signal is inserted into it. Each of the data frames d2 has a predetermined length, and data sets for data communication such as an image signal and a message are inserted into it. The clearing frame d3 indicates the end of the packet.

Note that the data frames d2 are periodically replaced with a resynchronization frame d4 (e.g. every 420 ms). A synchronization signal for synchronization with the radio apparatus of the communication party station is inserted into each resynchronization frame d4.

Next, with reference to FIG. 3, a description is given of data for data communication, which is to be inserted into the data frames d2. FIG. 3 shows the types of data to be inserted into each frame of the data part Pd. In this drawing, "audio" shows that audio signal data is inserted in the frame, and "data" shows that data for data communication is inserted in the frame.

Regarding the audio frames d1 and the data frames d2 constituting the data part Pd, the data amount of the audio frames d1 is set to be greater than the data mount of the data frames d2, because the transmission of audio signal data is given a high priority. Usually, 9 bytes of data is inserted into each of the audio frames d1, and 3 bytes of data is inserted into each of the data frames d2.

Furthermore, a mini-header d5, which includes the description of the data type, etc., is inserted in the beginning of the data frame d2. However, if the mini-header d5 is provided in every data frame, the amount of data that can be inserted in the data frame will be smaller, and therefore one mini-header d5 is inserted in one data frame out of every two data frames.

Therefore, as shown in FIG. 3 at the lower level, when generating the packet Pa, communication data d6 for data communication is divided into 5-byte portions, and 1-byte mini-header d5 is added to the beginning of each portion so as to compose a data block, and after that, the data block is divided into 3-byte portions, and these portions are respectively inserted into two adjacent data frames d2.

Then, information indicating the data type and the data length is written into each mini-header d5. The data length indicates the length of the effective data inserted in a single data block. For example, suppose the case of transmitting general-purpose data having a data length of 13 bytes, such as image data. First, when the data to be transmitted is divided into 5-byte portions as described above, the data will be divided into three portions, namely 5-byte portion, 5-byte portion, and 3-byte portion. Then, the mini-header d5 is added to the beginning of each of these data portions. Here, if the information indicating the general-purpose data such as image data is 0x3 for example, the mini-header d5 added to each of the first and second data blocks is 0x35, and the mini-header d5 added to the third data block is 0x33.

The controller 21 (see FIG. 1) retrieves, via the interface unit 19, the data indicating the data type, etc., from the data for data communication transmitted from an external device connected to the terminal 20, and stores the retrieved data to the RAM 24. Also, when the transmission unit 15 generates packets for transmission, the controller 21 reads the aforementioned data from the RAM 24 and transfers it to the transmission unit 15. In the transferred data, the information indicating the data type is written into the mini-header d5.

Meanwhile, when reproducing the data for data communication from the packets Pa reproduced by the reception unit 18, the reverse of the aforementioned process is performed, i.e., based on the information in the mini-header d5, a 5-byte communication data portion is retrieved from the data contained in two data frames d2, the data for data communication is reproduced by concatenating the 5-byte communication data portions with each other, and the data for data communication is transmitted to an external device via the interface unit 19.

Operations for Communication in Slow Data Mode

As described above, the radio communication system according to the present embodiment can perform communication in two modes, the slow data mode and the fast data mode. First, a description is given of the operations for communication in the slow data mode, with reference to FIG. 1 to FIG. 3.

The operation unit 26 has a mode switch 33 for switching between the communication modes, and the user can select either the slow data mode or the fast data mode by operating the switch 33. The slow data mode is selected when communication is performed with a conventional radio apparatus that has no option for a communication mode, or when no data for data communication needs to be transmitted, for example. Note that, the mode switch 33 may be other than the switch. For example, switching between the modes may be instructed from a menu screen displayed when a menu button or the like is pressed.

As a typical case where the slow data mode is used, the following describes the case where a radio station (the user's own station) within a given repeater area makes a call to a radio station (the communication party station) within another repeater area.

Figures 4, 5A, 5B:
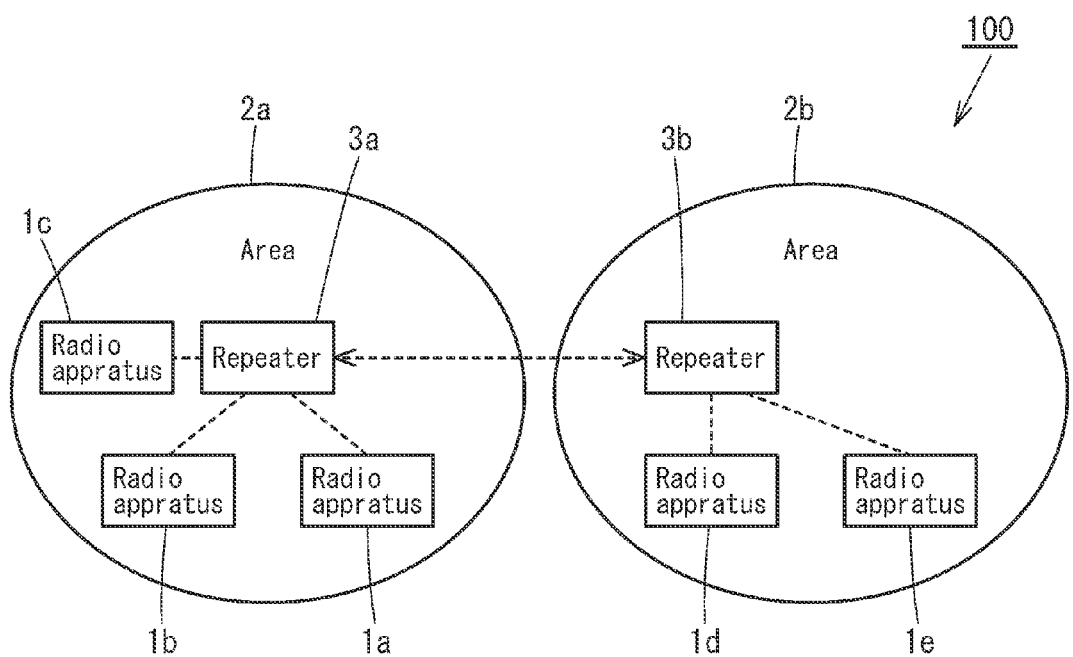
FIG. 4 is a diagram showing an arrangement of radio apparatuses and repeaters in a radio communication system according to the embodiment of the present invention.
FIG. 5A and FIG. 5B are diagrams respectively showing a configuration of an audio frame in a slow data mode and a configuration of an audio frame in a fast data mode.

FIG. 4 shows an arrangement of radio apparatuses and repeaters in a radio communication system according to the present embodiment. A radio communication system 100 includes at least two radio apparatuses 1 and at least one repeater 3. In the example shown in FIG. 4, radio apparatuses 1a, 1b, and 1c exist within an area 2a covered by a repeater 3a, and radio apparatuses 1d and 1e exist within an area 2b covered by a repeater 3b. The adjacent repeaters 3a and 3b transmit audio and data in a multiplexed state to each other by using microwaves.

The following describes a case in which the radio apparatus 1a within the area 2a and the radio apparatus 1d within the area 2b communicate with each other. Before starting the communication, the user operates the operation unit 26 of the radio apparatus 1a in order to store, to the non-volatile memory 25, information necessary for the communication, such as the call sign of the transmission source (the user's own station) and the call signs of the repeater stations.

When starting the communication, the user operates the operation unit 26 of the radio apparatus 1a in order to make a call with the designation of the call sign given to the transmission destination radio station and the call sign of the transmission destination repeater.

When the user presses the PTT switch 27, the information input from the operation unit 26 is provided to the transmission unit 15 by the controller 21, and the transmission unit 15 generates a packet according to an instruction from the controller 21. As shown in FIG. 2, the header part Ph of the packet Pa contains the call sign h3 of the transmission destination repeater, the call sign h4 of the transmission source repeater, the call sign h5 of the transmission destination (the communication party station), and the call sign h6 of the transmission source (the user's own station).

Within the data part Pd of the packet Pa, audio signal data output from the audio codec 14 is inserted into the audio frames d1, and data for data communication transferred from the interface unit 19 is inserted into the data frames d2.

The packet Pa generated and converted into radio signals by the transmission unit 15 are transmitted via the transmission/reception switching unit 16 and the antenna 17. The packet Pa transmitted by the radio apparatus 1a (the user's own station) is relayed by the repeaters 3a and 3b, and reaches the radio apparatus 1d (the communication party station).

The radio signals received by the radio apparatus 1d (the communication party station) are provided to the reception unit 18 via the antenna 17 and the transmission/reception switching unit 16, and are demodulated by the reception unit 18, and thus the packet Pa is reproduced. Furthermore, the header part Ph is removed from the packet Pa reproduced by the reception unit 18, and the data in the data part Pd is provided to the audio codec 14 or the interface unit 19, depending on the contents of the data.

Audio signal data provided to the audio codec 14 is decoded, and is furthermore converted into an analogue audio signal, and is then provided to the AF amplification unit 13. The audio signal amplified by the AF amplification unit 13 is output from the speaker 12, and thus the voice of the user of the transmission source is reproduced.

In contrast, the data for data communication obtained by demodulating the packet shown in FIG. 3 is transferred to an external device 31 via the interface unit 19.

Furthermore, the packet Pa reproduced by the reception unit 18 is provided to the controller 21. The CPU 22 of the controller 21 determines whether or not the packet Pa thus received is a valid packet by performing an ECC (Error Check Code) check, etc.

The CPU 22 stores, to the RAM 24, the data in the header part Ph of the packet Pa determined to be valid, and also analyzes the information in the header part Ph. According to the results of the analysis, the CPU 22 displays, on the display unit 28, the transmission destination call sign, the transmission source call sign, etc. of the received packet Pa.

The above-described processing for reproducing a packet from a radio signal received in the slow data mode is the same for both a radio apparatus that supports the fast data mode and a radio apparatus that does not support the fast data mode. Therefore, no particular problem arises even when an existing radio apparatus that does not support the fast data mode receives the radio signal.

Configuration of Audio Frame in Each Communication Mode

Prior to a description of the operations for communication in the fast data mode, a description is given of the configuration of the audio frame in the fast data mode, in comparison with the configuration of the audio frame in the slow data mode.

As described above with reference to FIG. 3, when audio communication and data communication are simultaneously performed in the slow data mode, i.e., the communication mode in which audio signal data is inserted into audio frames, 9 bytes of audio signal data is inserted into each audio frame d1. Meanwhile, regarding data for data communication, a data block composed of a communication data portion d6, which is one of the divided 5-byte portions, and the mini-header d5 added to the beginning of the communication data portion d6, is divided into two portions, and these two portions are respectively inserted into two data frames d2.

In contrast, in the case of using both the audio frames and the data frames to transmit data for data communication in the fast data mode, i.e., the mode in which data for data communication is inserted into audio frames, the data to be transmitted is divided into 20-byte portions, and the mini-header d5 added to each portion so as to compose a block, and the data of the block is divided and inserted into two adjacent audio frames d1 and two adjacent data frames d2.

Specifically, each block is 24-byte data composed of 20-byte data for data communication, a 1-byte mini-header, 2-byte unique data, which is described below, and 1-byte data to be inserted into data frames in order to prevent the misdetection of packet loss, and this data block is divided and inserted into two adjacent audio frames d1 (9 bytes×2) and two adjacent data frames d2 (3 bytes×2).

If a comparison is made between the case of inserting the audio signal data into the audio frames d1 of the packet Pa and the case of inserting the data for data communication into the audio frames d1, the communication speed of the latter case is approximately 3.5 times the communication speed of the former case, and the data for data communication can be transmitted at high speed in the latter case.

FIG. 5A shows the configuration of the audio frame in the slow data mode, and FIG. 5B shows the configuration of the audio frame in the fast data mode. In these figures, the numbers 1 to 9 shown at the middle level indicate the order of the data portions constituting the 9-byte audio frame. The type of data to be inserted in the corresponding byte position is shown at the lower level.

As shown in FIG. 5A, in the slow data mode, the audio signal data is inserted in every one of the portions that constitute the 9-byte audio frame. In contrast, as shown in FIG. 5B, in the fast data mode, data for data communication is inserted in the $1^{st}$ to $4^{th}$ and $6^{th}$ to $9^{th}$ portions, which have 8 bytes in total, out of the portions that constitute the 9-byte audio frame, and unique data is inserted in the $5^{th}$ 1-byte portion.

When the data of the audio frame shown in FIG. 5B is reproduced by a radio apparatus that supports the fast data mode, the $5^{th}$ 1-byte data is determined to be unique data for abnormal sound reduction based on the information in the mini-header d5, and only the 8-byte data is retrieved from the $1^{st}$ to $4^{th}$ and $6^{th}$ to $9^{th}$ portions and is reproduced as data for data communication, whereas the 1-byte data in the $5^{th}$ portion is not reproduced.

In contrast, when the data of the audio frame shown in FIG. 5B is reproduced by a radio apparatus that does not support the fast data mode, the entire 9-byte data is retrieved from the $1^{st}$ to $9^{th}$ portions, and is reproduced as audio signal data. Therefore, when the audio signal data thus reproduced is decoded by the audio codec 14, a meaningless signal is reproduced because it is actually not an audio signal, and consequently, the speaker 12 outputs an abnormal sound.

However, since the $5^{th}$ 1-byte data inserted in the audio frame is data that is likely to cause an error when decoded by the audio codec 14, the data is determined to be an error and is not output by the audio codec 14, and accordingly audio is not output from the speaker 12.

For example, in the case where an audio vocoder from Digital Voice Systems, Inc. (DVSI) is used as the audio codec 14 and two-digit hexadecimal data "0x02" is inserted in the $5^{th}$ 1-byte portion, the data is determined to be an error at the time of decoding by the audio codec 14, and no signal is output. Incidentally, audio vocoders from DVSI use a vocoder chip that employs the Advanced Multi-Band Excitation method as audio compression technology.

Therefore, when the data of the audio frame shown in FIG. 5B is reproduced by an existing radio apparatus that does not support the fast data mode, an error occurs in the audio codec 14, and consequently no signal is generated, and no abnormal sound is output from the speaker 12.

Operations for Communication in Fast Data Mode

Next, with reference to FIG. 6 and FIGS. 1 to 5B described above, a description is given of the operations for communication in the fast data mode. FIG. 6 is a flowchart showing processing performed by the controller 21 of the radio apparatus 1 that has received a radio signal.

Note that the descriptions of the operations that the user performs before starting the communication, such as the operation for storing the information necessary for the communication to the non-volatile memory 25, the operation for designating the transmission destination call sign and the call sign of the transmission destination repeater, and so on are omitted, because they are the same as in the communication performed in the slow data mode.

In the case of operating the radio apparatus 1 in the fast data mode, the user switches the mode switch 33 provided in the operation unit 26 to the fast data mode. The controller 21 causes the radio apparatus 1 to operate in the fast data mode according to the switch of communication mode.

When instructed to perform transmission in the fast data mode by the user operation, the controller 21 instructs the transmission unit 15 to perform transmission in the fast data mode. Upon being instructed by the controller 21 to perform transmission, the transmission unit 15 starts generating the packet Pa.

Specifically, the transmission unit 15 generates a packet in which data for data communication is inserted in each of the audio frames d1 and each of the data frames d2. Furthermore, as shown in FIG. 5B, data for data communication is inserted into the 8-byte portion out of the audio frame d1 except the $5^{th}$ 1-byte portion.

At this time, the $5^{th}$ 1-byte data portion is transmitted from the controller 21 to the transmission unit 15. Also, according to an instruction from the controller 21, information indicating that data for data communication is inserted in the audio frames d1, and that unique data is inserted in the $5^{th}$ 1-byte portion of the audio frame, is written into the mini-header d5 (see FIG. 3). The packet Pa thus generated is furthermore converted into high-frequency signals by the transmission unit 15, and they are transmitted from the antenna 17 as radio signals.

The controller 21 of the radio apparatus (the communication party station) 1d, which has received radio signals transmitted from the radio apparatus (the user's own station) 1 a operating in the above-described fast data mode, processes the packet Pa according to the flowchart shown in FIG. 6.

First, the controller 21 retrieves the data in the data frames d2 from the data of the packet Pa, which has been reproduced by the reception unit 18 from the radio signals, and then writes it into a built-in register (not shown in the drawings) (Step S11). The controller 21 analyzes the information in the mini-header d5, and determines whether or not the packet Pa is a packet transmitted in the fast data mode (Step S12).

The controller 21 confirms that the data for data communication is inserted in the audio frames d1 (Yes in Step S13), and instructs the reception unit 18 to retrieve the 8-byte data for data communication from the audio frames d1, while excluding the $5^{th}$ 1-byte data from the audio frames d1 (Step S14).

Next, the controller 21 concatenates the data portions retrieved from two adjacent audio frames d1 and two adjacent data frames d2 in reverse order to how the block is created as described above, thereby reproducing the data for data communication (Step S15). The data for data communication thus reproduced is output to the interface unit 19.

The controller 21 instructs the interface unit 19 to transfer the reproduced data for data communication to the external device (Step S16), and the interface unit 19 outputs the reproduced data for data communication to the external device 31 according to the instruction.

Incidentally, in the case where the radio apparatus 1 receives radio signals in the slow data mode, the controller 21 confirms in Step S13 that audio signal data is inserted in the audio frames d1 (No in Step S13), and instructs the reception unit 18 to retrieve all of the 9-byte data included in the audio frames d1 (Step S17).

Next, the controller 21 instructs the audio codec 14 to decode the audio signal data retrieved from the reception unit 18 (Step S18), and the audio codec 14 performs audio signal decoding according to the instruction from the controller 21. The audio signal decoded and converted into an analogue audio signal is output from the speaker 12.

In parallel with Steps S17 and S18, the controller 21 concatenates the data portions retrieved from the data frames d2 and stored in the register, thereby reproducing the data for data communication (Step S19). The data for data communication thus reproduced is output to the interface unit 19.

Next, the controller 21 performs the above-described Step S16, in other words instructs the interface unit 19 to transfer the reproduced data for data communication to the external device 31, and the interface unit 19 outputs the reproduced data for data communication to the external device 31 according to the instruction.

As described above, with use of the radio communication system according to the present embodiment, even in the case where an existing radio apparatus that does not support the fast data mode receives a packet in which data for data communication is inserted in the audio frames, the abnormal sound generated by the speaker can be reduced to such a level that is not problematic in practical use.

Consequently, even in the case of using a mix of a radio apparatus that supports the fast data mode and an existing radio apparatus that does not support the fast data mode, both radio apparatuses can be used without a problem.

According to the embodiment above, the unique data "0x02" is inserted into the $5^{th}$ 1-byte portion of the audio frame. However, the position of insertion and data to be inserted is not limited to the above. In the case of using an audio codec other than the audio vocoder used in the present embodiment, the position and the contents of data to be inserted into the audio frames may be changed according to the audio codec that is used. The point is to select data that is likely to cause an error when decoded by the audio codec.

Although the present invention has been fully described by way of example with reference to the accompanied drawings, it is to be understood that various changes and modifications will be apparent to those skilled in the art.

Therefore, unless otherwise such changes and modifications from the scope of the present invention hereinafter defined, they should be construed as being included therein.

What is claimed is:

1. A radio communication system including at least two radio apparatuses, each radio apparatus is configured to:
generate a packet including a header part containing identifier data identifying at least a transmission destination radio station and a transmission source radio station; and a data part in which an audio frame and a data frame, each having a predetermined length, are consecutively arranged one after another, to insert audio signal data into the audio frame of the packet and to insert data other than the audio signal data into the data frame of the packet, and to thereafter convert the packet into a radio signal and transmit the radio signal; and receive the radio signal, to reproduce a packet from the radio signal, to retrieve the audio signal data from the audio frame of the packet, and to retrieve the data other than the audio signal data from the data frame of the packet; and each radio apparatus comprising:
an audio codec configured to generate a digital audio signal by performing A/D conversion and encoding on an analogue audio signal, and to reproduce an analogue audio signal by performing decoding and D/A conversion on a digital audio signal; and
a controller configured to instruct the radio apparatus to generate a packet, and to reproduce a packet from a received radio signal,
wherein, when communication is performed in a fast data mode in which data for data communication to be transmitted, instead of audio signal data, is inserted in the audio frame,
the radio apparatus serving as a sender generates, according to an instruction from the controller, a packet in which the data for data communication is inserted in positions in the audio frame excluding a given position, and in the data frame, and unique data is inserted in the given position in the audio frame, and
the controller serving as a recipient, which has received a radio signal, instructs the radio apparatus to retrieve data portions other than the unique data from the audio frame and the data frame of the packet, which has been reproduced, and reproduces the data for data communication by concatenating the retrieved data portions.

2. The radio communication system according to claim 1, wherein the data frame has a mini-header that contains information about data to be inserted in the data frame, and
when communication is performed in the fast data mode, the radio apparatus inserts the data for data communication in the positions in the audio frame excluding the given position, and writes, in the mini-header, the information indicating that the unique data is inserted in the given position in the audio frame.

3. A radio apparatus configured to generate a packet including a header part containing identifier data identifying at least a transmission destination radio station and a transmission source radio station; and a data part in which an audio frame and a data frame, each having a predetermined length, are consecutively arranged one after another, to insert audio signal data into the audio frame of the packet and to insert data other than the audio signal data into the data frame of the packet, and to thereafter convert the packet into a radio signal and transmit the radio signal, the radio apparatus, comprising:
an audio codec configured to generate a digital audio signal by performing A/D conversion and encoding on an analogue audio signal; and
a controller configured to instruct the radio apparatus to generate a packet,
wherein, when operating in a fast data mode in which data for data communication to be transmitted, instead of audio signal data, is inserted in the audio frame,
the radio apparatus generates, according to an instruction from the controller, a packet in which the data for data communication is inserted in positions in the audio frame, excluding a given position, and in the data frame, and in which unique data is inserted in the given position in the audio frame.

4. The radio apparatus according to claim 3, further configured to receive the radio signal, reproduce the packet from the radio signal, and retrieve audio signal data from the audio frame of the packet and data other than the audio signal data from the data frame of the packet,
wherein, when a radio signal transmitted in the fast data mode is received,
the controller instructs the radio apparatus to retrieve data portions other than the unique data from the audio frame and the data frame of the packet, which has been reproduced, and reproduces the data for data communication by concatenating the retrieved data portions.

5. A radio communication method for a radio communication system including at least two radio apparatuses, one of the at least two radio apparatuses being configured to generate a packet including a header part containing identifier data identifying at least a transmission destination radio station and a transmission source radio station; and a data part in which an audio frame and a data frame, each having a predetermined length, are consecutively arranged one after another, and to convert the packet into a radio signal and transmit the radio signal, and another one of the at least two radio apparatuses being configured to receive the radio signal and reproduce a packet from the received radio signal, the radio communication method comprising the steps of:
in a radio apparatus serving as a sender,
generating a packet in which data for data communication is inserted in positions in the audio frame, excluding a given position, and in the data frame, and unique data is inserted in the given position in the audio frame; and
converting the packet thus generated into a radio signal, and transmitting the radio signal, and
in a radio apparatus serving as a recipient,
receiving the radio signal;
reproducing a packet from the received radio signal;
retrieving data portions other than the unique data from the audio frame and the data frame of the reproduced packet; and
reproducing data for data communication by concatenating the retrieved data portions.

6. A packet generation method for a radio apparatus that performs communication with another radio apparatus by using a packet including a header part containing identifier data identifying at least a transmission destination radio station and a transmission source radio station; and a data part in which an audio frame and a data frame, each having a predetermined length, are consecutively arranged one after another, the packet generation method comprising the step of:
in the radio apparatus,
determining whether or not the communication is performed in a fast data mode;
when communication is performed in a fast data mode in which data for data communication to be transmitted, instead of audio signal data, is inserted in the audio frame, generating a packet in which data for data communication is inserted in positions in the audio frame, excluding a given position, and in the data frame, and unique data likely to cause an error when decoded by an audio codec is inserted in the given position in the audio frame; and
when communication is not performed in a fast data mode, generating a packet in which audio signal data is inserted in the audio frame, and data for data communication is inserted in the data frame.

7. A method for reproducing data from a packet performed by a radio apparatus that is configured to receive a radio signal containing a packet generated by the packet generation method according to claim 6, and to reproduce the packet from the radio signal, the method comprising the steps of:

retrieving data portions other than the unique data from the audio frame and the data frame of the reproduced packet; and reproducing the data for data communication by concatenating the retrieved data portions.

* * * * *